(12) United States Patent
Schneider et al.

(10) Patent No.: US 6,240,232 B1
(45) Date of Patent: May 29, 2001

(54) PROCESS FOR THE PRODUCTION OF A WAVEGUIDE BEAM CONVERTER

(75) Inventors: Hartmut Schneider, Munich; Werner Spaeth, Holzkirchen; Stefan Groetsch, Regensburg, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/155,632
(22) PCT Filed: Mar. 21, 1997
(86) PCT No.: PCT/DE97/00579
  § 371 Date: Feb. 25, 1999
  § 102(e) Date: Feb. 25, 1999
(87) PCT Pub. No.: WO97/37257
  PCT Pub. Date: Oct. 9, 1997

(30) Foreign Application Priority Data

Mar. 29, 1996 (DE) .............................................. 196 12 673

(51) Int. Cl.$^7$ ................................ G02B 6/10; G02B 6/26
(52) U.S. Cl. ............................................................. 385/129
(58) Field of Search .................................. 385/3, 16, 129, 385/147; 369/110, 112, 44.23; 324/207.13, 207.24

(56) References Cited

U.S. PATENT DOCUMENTS

| 5,078,514 | 1/1992 | Valette et al. . |
| 5,148,503 | * 9/1992 | Skeie ......................................... 385/3 |
| 5,206,586 | * 4/1993 | Yauch et al. .................... 324/207.13 |
| 5,343,546 | 8/1994 | Cronin et al. . |
| 5,835,472 | * 11/1998 | Horie et al. .......................... 369/110 |

FOREIGN PATENT DOCUMENTS 0 451 018 A1   10/1991   (EP) .

OTHER PUBLICATIONS

International Publication WO 90/14316 (Jansen), dated Nov. 29, 1990.
International Publication WO 94/15234 (Po et al.), dated Jul. 7, 1994.
C.J. Sun et al.: "High Silica Waveguides on Alumina on Substrates for Hybrid Optoelectronic Integration", IEEE Photonics Technology Letters, vol. 4, No. 6, Jun. 1992, pp. 630–632.
Terry T.H. Eng et al.: "Surface–micromachined epitaxial silicon cantilevers as movable optical waveguides on silicon–on–insulator substrates", Sensors and Actuators, vol. A49, Nos. 1/2, Jun. 1995, pp. 109–113.

* cited by examiner

Primary Examiner—Akm E. Ullah
(74) Attorney, Agent, or Firm—Herbert L. Lerner; Laurence A. Greenberg; Werner H. Stemer

(57) ABSTRACT

Process for the production of a waveguide beam converter for shaping a laser beam collection. A plurality of waveguides are produced and arranged in such a way that at least one individual laser beam can be injected into each waveguide. The waveguides are firstly produced on a substrate using planar technology, and subsequently detached from the substrate over a part of their length, starting from their beam exit ends. The free ends are then arranged and fixed in accordance with an intended output beam arrangement of the output laser beam collection.

7 Claims, 3 Drawing Sheets

PROCESS FOR THE PRODUCTION OF A WAVEGUIDE BEAM CONVERTER

BACKGROUND OF THE INVENTION

FIELD OF THE INVENTION

The invention relates to a process for the production of a waveguide beam converter according to the preamble of claim The process according to the invention is used, in particular, for the production of a waveguide beam converter for increasing the radiation density of a laser beam collection emitted by a linear array of laser diodes.

Individual semiconductor laser diodes are known to represent radiation sources with high radiation density. For physical reasons, however, substantial limitations are found for semiconductor-laser radiation sources with high radiation power. This is because laser diodes output individual laser beams in the form of stripes, so that in order to produce a compact laser beam collection with high radiation power, the striped individual laser beams need to be arranged above one another. However, the high power loss from semiconductor laser diodes places a limitation on the packing density of individual laser diodes. It is therefore necessary for the individual laser beams emitted by a plurality of individual laser diodes to be concentrated, for example using a waveguide beam converter.

A waveguide beam converter of this type is, for example, disclosed by international patent application WO 94/152 34. This document describes a fiber-optic arrangement made up of a plurality of curved rectangular optical fibers, by means of which an input laser beam collection which is emitted by a linear array of laser diodes and consists of individual laser beams arranged next to one another, is converted into an output laser beam connection made up of striped individual laser beams arranged above one another. At their input, the optical fibers are arranged next to one another in a line, so that each individual laser beam of the input laser beam collection is injected into a separate optical fiber. At their output, the optical fibers are arranged above one another in the form of a stack, so that an output laser beam collection of rectangular cross section is emitted from the end faces of the optical fibers. This output laser beam collection is subsequently injected through a spherical lens into a fiber laser of circular cross section.

At their input, the optical fibers are fastened in precision grooves in an alignment block, these being designed in such a way that the arrangement and spacing of the optical fibers with respect to one another corresponds to the arrangement and spacing of the individual laser beams injected. The optical fibers are made of silicate glasses containing alkali metals or alkaline earth metals (soft glass), for example BAK 5 for the fiber core and BAK 2 for the fiber cladding, which is in turn enclosed by a supporting clad made, for example, of LAKN 12. The fiber-optic bundle is produced by the following steps:

Firstly, the fiber core with the fiber cladding is produced. Subsequently, the fiber cladding is covered with the material of the support clad, which has a significantly higher etching rate than the material of the fiber cladding. Before the material of the support clad is subsequently etched off down to a thin support clad layer, the above-described composite made up of the fiber core, fiber cladding and support clad layer is drawn in such a way that, after drawing, the cross section of the fiber core is still somewhat greater than the intended final size.

A number of optical fibers produced in this way are then stacked on one another and connected to one another. The stack is then once more provided with a jacket and then again drawn until the stack has the desired geometry. The optical fibers in the stack are subsequently separated at one end of the stack by etching, fastened next to one another in the precision grooves of the alignment block and formed in such a way that individual laser beams emitted from the linear array of laser diodes can be injected into the ends of the fibers.

As can be seen from the description above, the production of a waveguide beam converter of the type mentioned in the introduction is currently elaborate and complicated, and therefore very cost-intensive.

SUMMARY OF THE INVENTION

The object of the invention is to provide a process for the production of a waveguide beam converter which is simple to carry out and makes it possible, in a straightforward way, to produce a plurality of waveguide beam converters at the same time.

This object is achieved by a process of the type mentioned in the introduction, having the features of claim 1.

The advantage of this process according to the invention consists, in particular, in that the production of the waveguide beam converter requires only a small number of process steps, known from planar technology, which are straightforward to carry out.

Further, in the process according to the invention, it is advantageously possible to produce glasses of high optical quality on a substrate in accordance with requirements. The glass compositions may be tailored to the specific purpose. Radiation losses in the waveguide beam converter can in this way be kept as small as possible.

Further, it is possible with the process according to the invention, in a straightforward way, to tailor the glass properties to the constraints pertaining to the system as a whole, by varying the glass compositions.

A particular advantage of this production process consists in that the laser diode array, for example a linear array of laser diodes or a plurality of individual laser diode chips, can be fitted on the same substrate as the waveguide beam converter. Likewise, coupling lenses for injecting the input laser beam collection into the waveguide beam converter and/or coupling lenses for injecting the output laser beam collection into an individual optical fiber, a further laser or a different device, may also be arranged on this substrate. The result achieved by this is that both the laser diode array and coupling lenses, which may be necessary, can be mounted in a straightforward way so as to be precisely aligned with the waveguide beam converter. To this end, for example, positioning holes or edges may be produced in or on the substrate.

It is further advantageous that the waveguides can be made from an $SiO_2$ glass which contains more than 50 cation % of $SiO_2$. Glasses of this type have high optical quality. The radiation losses in the waveguide beam converter, that is to say both in the light-carrying waveguide core and at the interface between the waveguide core and the waveguide cladding, can consequently be kept low. An essential advantage of the aforementioned $SiO_2$ glasses is that they can be produced by vapor deposition, which substantially facilitates the production of glass layers on a substrate. Individual glass layers can be produced without great difficulty free of bubbles and free of cords so that they are placed precisely above one another, which produces interfaces which are free of defects and therefore of high optical quality. A further advantage is that these glasses can be removed again by vapor-phase etching methods.

An advantageous process for the production of a waveguide on a substrate, the waveguide being detached from the substrate at least over a first part of its length and being connected to the substrate over a second part of its length, and an advantageous embodiment of the process according to the invention are given in claim 4 and claim 5, respectively. An advantage in this case is that use is exclusively made of process steps known from planar technology, which can be carried out in conventional semiconductor technology fabrication lines.

It is also advantageously possible with the process according to the invention, in a straightforward way, to produce a waveguide beam converter in which the waveguides are arranged in such a way that a plurality of output laser beam collections can be extracted from them. As a result, it is advantageously possible for the input laser beam collection emitted by a laser diode array to be shaped into a plurality of rectangular output laser beam collections, which can then in turn be injected very efficiently into waveguides with a round cross section.

DESCRIPTION OF THE PREFERRED EMBODIMENTS

Figure 1:
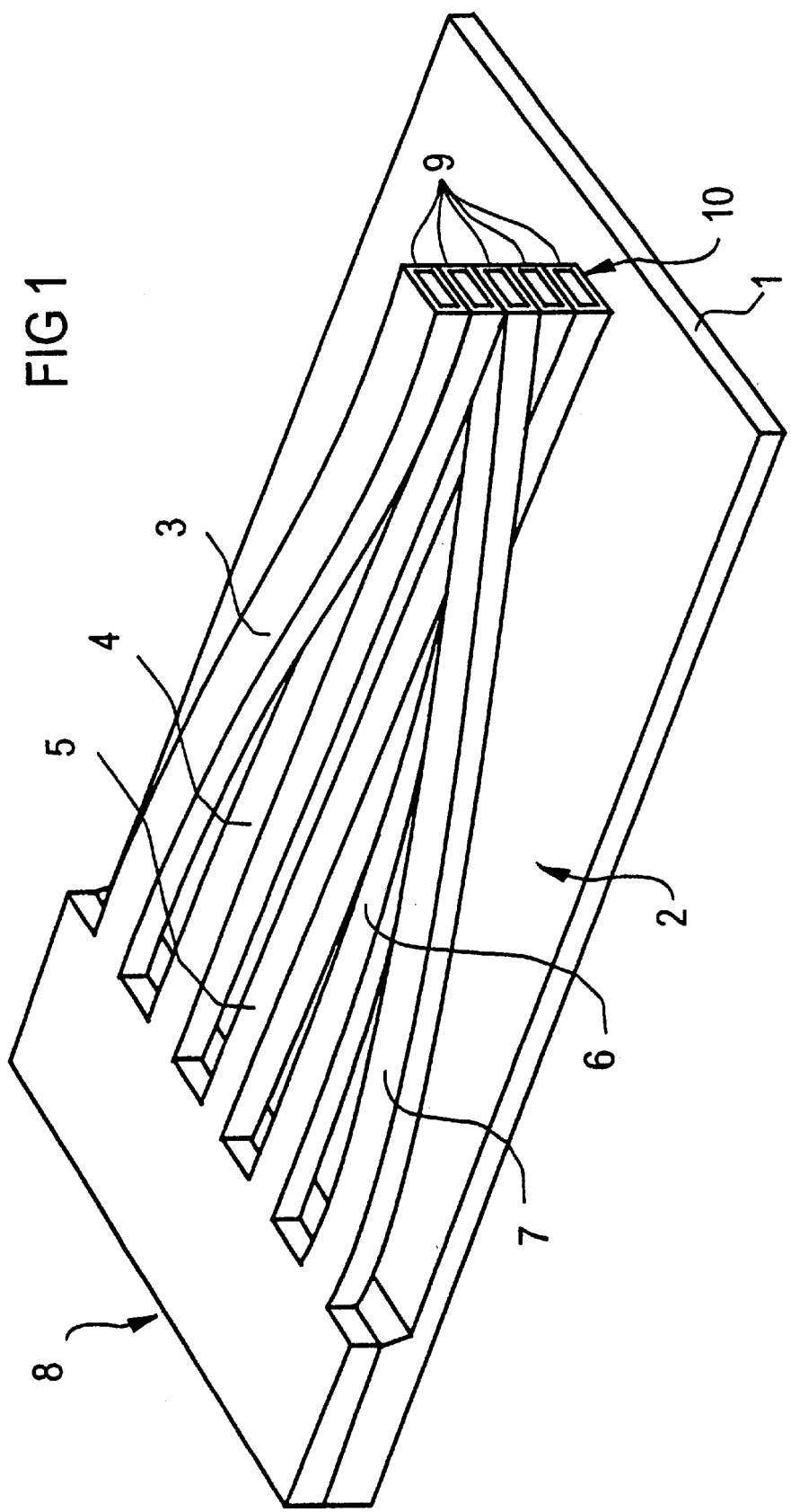
FIG. 1 shows a schematic perspective representation of a waveguide beam converter which is produced using the process according to the invention.

In the arrangement represented in FIG. 1, a waveguide beam converter 2 is arranged on a substrate 1, for example a silicon substrate, the converter consisting, for example, of 5 waveguides 3 to 7. At the beam input ends 8, the waveguides 3 to 7 are arranged lying next to one another on the substrate 1. The waveguides 3–7 are detached from the substrate over a portion 27 of their length and, at the beam exit ends 9, the waveguides 3–7 are combined and fixed to form a stack 10 consisting of waveguide ends arranged above one another.

The individual laser beams which are emitted by a laser diode array 11, for example a linear array of laser diodes, and each have, for example, a striped cross section, can be injected into the beam entry ends 8 of the waveguides 3 to 7. The individual laser beams may consist of a single laser beam or of a plurality of individual laser beams which are smaller in cross section. An individual laser beam which is striped in cross section may have a beam width of about 200 $\mu$m and a beam height of about 2 $\mu$m.

Figure 2:
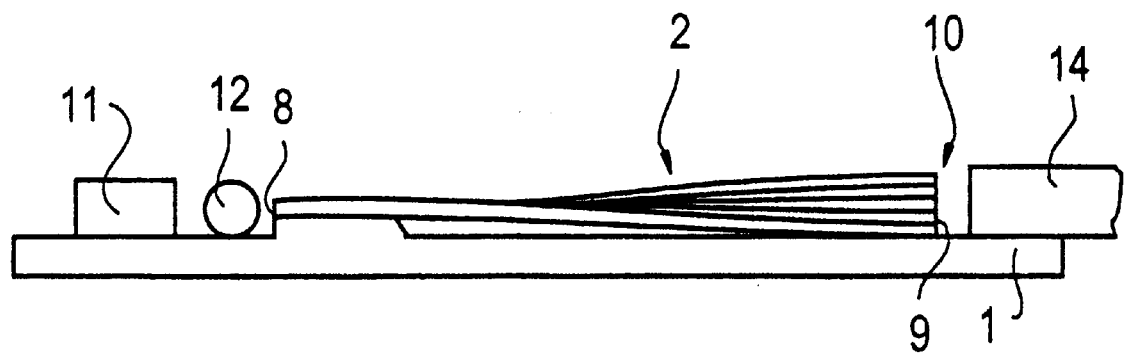
FIG. 2 is a schematic representation of a side view of a waveguide beam converter which is produced using the process according to the invention and which, at its input, is optically coupled at its input to a laser diode array and, at its output, to an optical fiber.

A beam collimator 12 (FIG. 2) for example a cylindrical lens or a diffraction grating, which at least reduces any vertical divergence of the individual laser beams, may be arranged between the laser diode array 11 and the light entry ends 8. The dimensions of the waveguides 3 to 7 are latched to the dimensions of the individual laser beams to be injected.

A rectangular output laser beam collection can be extracted from the beam exit ends 9 arranged as a stack 10, and can be injected, for example, through a spherical lens or directly into a waveguide 14, for example circular in cross section, into a fiber laser or into another laser.

Figure 3:
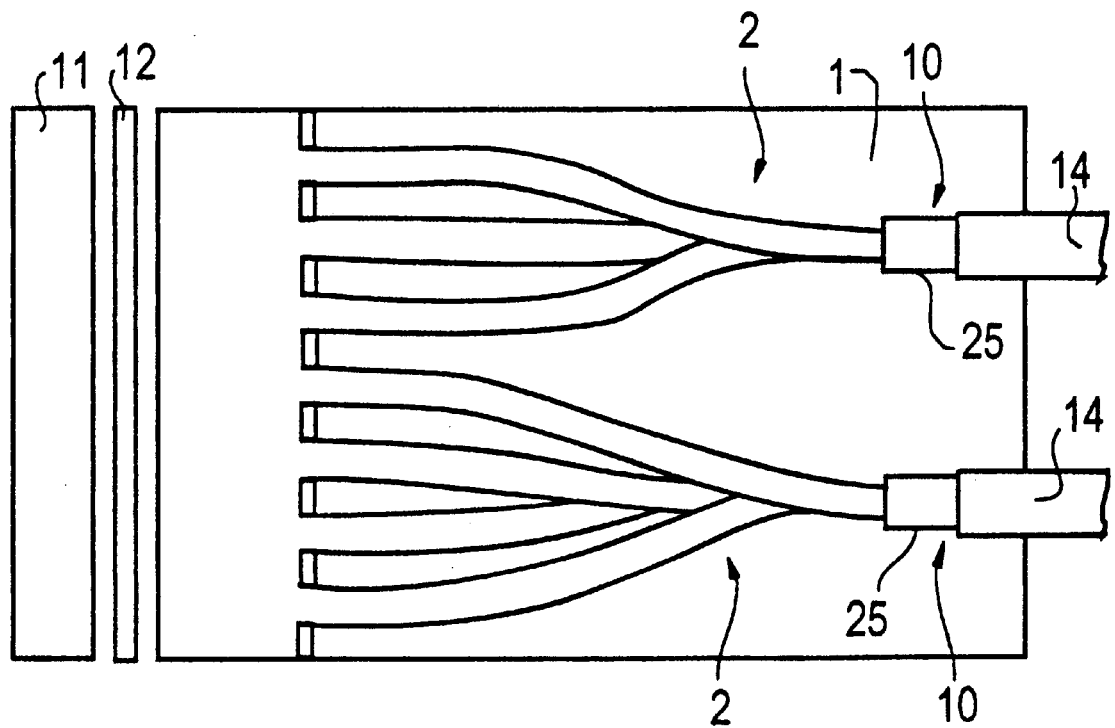
FIG. 3 shows a schematic representation of a plan view of a second embodiment of a waveguide beam converter, which is produced using the process according to the invention.

As shown in FIG. 3, the process according to the invention may also be used to produce waveguide beam converters 2 with which an input laser beam collection made up of a plurality of individual laser beams can be shaped into a plurality of output laser beam collections, each consisting of a number of individual laser beams. In this embodiment, the ends of the waveguide bundles are, for example, fitted into sleeves 25, and this is naturally also possible in all the other embodiments.

The waveguide beam converter 2 may, naturally, both in the embodiment represented in FIG. 1 and in the one represented in FIG. 3, be designed for an arbitrary number of individual laser beams. It is merely necessary to match the number of waveguides to the number of individual laser beams.

The process according to the invention is generally carried out as follows:

Firstly, a number of waveguides 3–7 (for example consisting of $SiO_2$ glass with $\geq 50$ cation % $SiO_2$) are produced in the form of an array of linear stripes, on a substrate, for example a silicon substrate, using planar technology methods. The cross section, the acceptance angle and the spacing of the waveguides 3–7 are in this case matched exactly to the characteristics of the input laser beam collection. The waveguides 3 to 7 are then, starting from their beam exit ends 9, detached from the substrate 1 over a portion 27 of their length, using a suitable etching technique and when appropriate while preserving their cross-sectional shape. The free portions 27 of the lengths of the waveguides 3 to 7 are then shifted, while avoiding too small radii of curvature, out of a beam plane of the input laser beam collection, and are combined to form a stack 10. The shape of the cross section of this stack 10 may be a rectangle, parallelogram or other shape suitable for the purpose in question.

Figure 4:
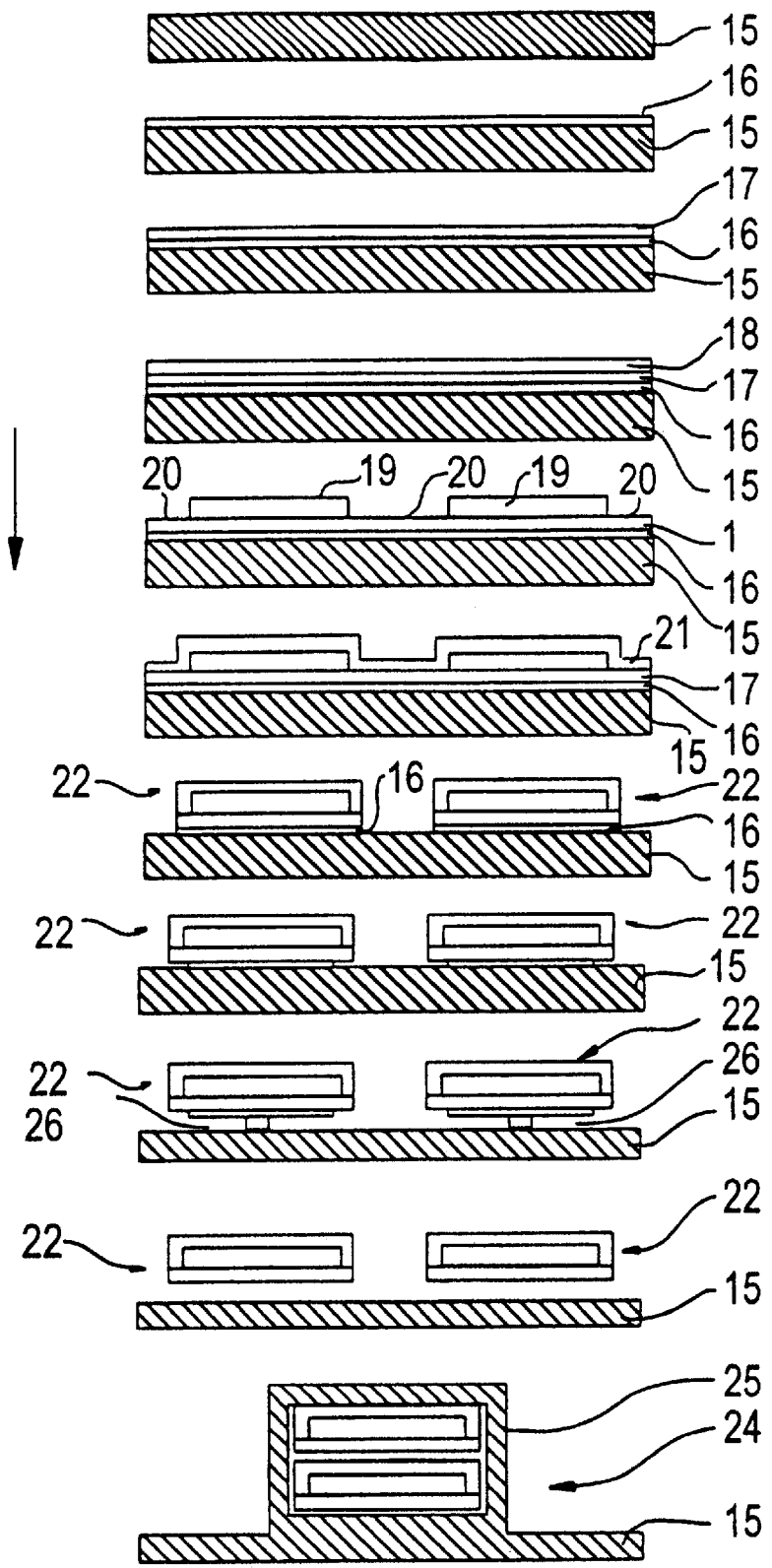
FIG. 4 shows a schematic representation of the process according to the invention as it is carried out.

In the detailed procedure of a process according to the invention, schematically represented in FIG. 4, a partition layer 16, for example consisting of pure $SiO_2$, $SiO_2$—$GeO_2$ glass or $SiO_2$—$P_2O_5$ glass and having a thickness of about 0.75–3 $\mu$m, is firstly applied to a (100) silicon wafer 15. Next, a first cladding glass layer 17 is applied to the partition layer 16, and a core layer 18 is applied to this cladding glass layer 17. The first cladding glass layer 17 consists, for example, of $SiO_2$ glass with $\geq 50$ cation % $SiO_2$, the remaining cations being preferably selected from the group B, Ge, P, Ti. A glass having the following composition is, in particular, suitable: 20–35 cation % $BO_{1.5}$/0.7–1.2 cation % $GeO_2$/64–78 cation % $SiO_2$.

The first cladding glass layer 17 has, for example, a thickness of about 5 to 10 $\mu$m. The core layer 18 consists, for example, likewise of $SiO_2$ glass with $\geq 50$ cation % $SiO_2$, the remaining cations being preferably selected from the group B, Ge, P, Ti, but the Ge and/or Ti content being considerably higher than in the cladding glass layer 17. A glass having the following composition is, in particular, suitable: 15–20 cation % $BO_{1.5}$/8–18 cation % $GeO_2$/60–75 cation % $SiO_2$. By increasing the Ge and/or Ti content, a higher refractive index is obtained in comparison with the first cladding glass layer 17, corresponding to the desired numerical aperture. The core layer 18 is then structured using photolithography in conjunction with dry and/or wet etching. The width, length and spacing of the waveguide cores 18 are thereby set relative to one another. These values are matched to the dimensions of the laser diode array 11 and the characteristics of the input laser beam collection.

A second cladding glass layer 21, which consists of $SiO_2$ glass with $\geq 50$ cation % $SiO_2$, the remaining cations preferably being selected from the group B, Ge, P, Ti, is then applied to the waveguide cores 19 remaining on the first cladding glass layer 17 and to the free surfaces 20 of the cladding glass layer 17. A glass having the following composition is, in particular, suitable: 20–35 cation % $BO_{1.5}$/ 0.7–1.2 cation % $GeO_2$/64–78 cation % $SiO_2$. The second cladding glass layer 21 has, for example, a thickness of from 5 to 10 $\mu$m.

An example of a suitable production process for individual glass layers is flame hydrolysis, a method known from fiberoptic technology, which is in particular suitable for the production of glass layers (thickness $\geq 5$ $\mu$m). It is also, however, possible to use another process known by the person skilled in the art to be suitable.

Before the waveguides are etched free, a part of the cladding glass layers 17, 21 lying between the wave guide cores 19, as well as the partition layer 16, are removed in such a way that a number of waveguide cores 19 fully enclosed by a cladding glass layer 17, 21 is left, and the silicon wafer 15 is exposed between them.

The waveguides are detached over a part of their length in the following way:

Optionally, a part of the partition layer 16 lying between the first cladding glass layer 17 and the (100) silicon wafer 15 is removed from both sides of the waveguides 22, for example by etching with an $NH_4F/HF$ etch mixture. This has been found to be suitable for initiating the etching of the (100) silicon wafer 15. It has also been found favorable to select the composition of the partition layer 16 in such a way that it can be etched more quickly than the neighboring materials, or at least more quickly than the first cladding glass layer 17 which lies above the partition layer 16. This is, for example, achieved in that the glass layers of the waveguides consist of $B_2O_3$—$SiO_2$ glass which dissolves more slowly in an $NH_4/HF$ etch mixture than $B_2O_3$-free $SiO_2$ glass. The rule found is: the higher the B content, the lower the etching rate.

By partially etching away the partition layer 16 in this way, the upper side of the silicon wafer is partially exposed below the waveguides 22. This step of etching the partition may be repeated several times while the (100) silicon is being etched away below the waveguides 22, and in alternation with this etching. Etching away the partition layer 16 can prevent regions with a lower etching rate, for example (111) faces, which may occur in the form of peaks under the glass front, from causing detrimental retention of the etching front below the waveguides.

After the partition layer 16 has been etched away, the (100) silicon is then removed using a suitable etchant (for example KOH solution, about 50% by weight, 50° C.) below the waveguides 22 in such a way that the waveguides 22 are detached from the silicon wafer 15 over a part of their length (selective etching with an etching ratio v((100)-Si):v(B- doped $SiO_2$ glass)$\approx$80:1). The waveguides 22 are arranged parallel to the (100) direction on the surface of the silicon wafer 15, so that a U-shaped trench 26 can be formed between the waveguides and the silicon wafer 15. This trench 26 ideally has exactly vertical bounding faces.

Instead of a (100) silicon wafer 15, it is for example also possible to use a (110) silicon wafer or a different semiconductor wafer. The orientation of the waveguides 22, the compositions of the individual glass layers and the etchants must then, naturally, be tailored to the relevant situation.

A critical point in the production process is represented by the tension state of the partition layer 16. If the partition layer 16 is under tensile stress relative to the glass of the waveguides 22 (the partition layer has a higher coefficient of thermal expansion than the overlying cladding glass layer (17), then this may lead to fracture when the substrate is detached. If it is under compressive stress (for example partition layer made of pure $SiO_2$), then this risk is less. A partition layer 16 of this type must be thick enough so that cracks in it produced during the detachment do not penetrate the tensioned glass layers of the waveguides 22, which may also cause damage to the waveguides 22. A 0.75 $\mu$m–3 $\mu$m thick layer of $SiO_2$—$Ge_2$ glass or $SiO_2$—$P_2O_5$ glass meets the aforementioned requirements. It may either be applied directly to the substrate by flame hydrolysis or approximated by a 2-layer system of 200 $\mu$m thermal $SiO_2$ followed by 1–3 $\mu$m $SiO_2$—$GeO_2$ glass.

As a further possibility, a graded layer may also be formed as the partition layer 16. In this case, a thin (for example 750 $\mu$m thick) Si oxide layer is firstly grown. A first cladding glass layer 17, to which $GeO_2$ is added, is then applied to the oxide layer. During a heat treatment in the further course of the process, for example at 1200° C., Ge diffuses into the $SiO_2$ layer. The partition layer 16 is used up during this procedure or removed after the KOH etching in an $NH_4F/HF$ cleaning etching step. The partition layer 16 is preserved over the length of the waveguides 22 which is not etched free.

To further optimize the stress pattern in the waveguides 22 and to reduce the risk of fracture, the composition may be controlled in the three-phase system $SiO_2$—$B_2O_3$—$GeO_2$ in such a way that, while maintaining the desired refractive indices of the core glass layer 18 and of the cladding glass layers 17, 21, the coefficient of thermal expansion increases from the first cladding glass layer 17, through the core glass layer 18, to the second cladding glass layer 21. $TiO_2$ or $P_2O_5$ may optionally be added to the aforementioned three-phase system. The expansion coefficient of the second cladding glass layer 21 is then closest to that of the silicon wafer 15. This can be done, in the case of refractive-index compensation using $GeO_2$, through an increase in the $B_2O_3$ content or the $P_2O_5$ content. Waveguides 22 produced in this way have, when etched free, a specific upward curvature. During the concluding phase of the process of detaching the waveguides 22, it is therefore less likely that cracks will cause accidental fracture.

Since, after a sufficient time of etching back in KOH and/or $NH_4/HF$, cracks caused by the detachment are rounded off or removed, a sufficient final strength of the waveguides 22 can be obtained without further measures being taken. Nevertheless, to round the edges further, a subsequent heat treatment may also be carried out at temperatures of about 800° C.

To secure and bond/solder the beam exit ends of the waveguides 22, that is to say, for example, of the fiber stack(s) 24, and to finish the beam exit ends, use may be made of an L- or U-shaped or closed sleeve 25 into which the exposed upwardly curved waveguides 22 are placed, for example inserted.

The beam exit ends of the waveguides 22 may be sawed and polished or provided with an antireflection layer and bloomed. This is also true of the beam entry ends of the waveguides 22.

In order to avoid aging effects (stress-crack corrosion), it is possible for the waveguides 22 to have a protective layer applied to them, for example made of a glass having a high $SiO_2$ content or of silicon nitride (this can be produced by plasma methods) and having a thickness of about 2 μm.

Beside the function mentioned above, the partition layer 16 has the purpose of protecting the Si crystal against the diffusion of impurities into it, which can cause a change in the rate at which the silicon is etched. Boron diffusion from the glass layers arranged above (cladding glass layers 17, 21 and core layer 18) leads, for example, to a drastic reduction in the Si etching rate in KOH, so that detachment of the waveguides 22 is practically prevented. The partition layer 16 must therefore, at least at the boundary with the silicon wafer, be free of dopants that reduce the silicon etching rate.

With the process described above, it is advantageously possible, by varying the glass compositions, to tailor the glass properties to the constraints given for the system as a whole. The layer thicknesses and the numerical aperture of the waveguides can be matched quickly in the production process to the input laser beam collection.

A further advantage of the process according to the invention consists in the fact that the spacings between the waveguides on the substrate can be matched by photolithographic methods straightforwardly to the repeat interval of the laser diode array.

What is claimed is:

1. A process for producing a waveguide beam converter for geometrical shaping laser beams, which comprises:
   producing waveguides each having a beam exit end and a given length on a substrate using planar technology;
   configuring and disposing each of the waveguides for receiving at least one individual input laser beam;
   detaching at least one of the waveguides, over a part of the given length, from the substrate starting from the beam exit end; and
   forming and fastening the waveguides for producing a desired output beam pattern of a collection of output laser beams derived from a collection of input laser beams.

2. The process according to claim 1, which comprises fitting a laser diode array having a plurality of individual laser beams outputting the collection of input laser beams for forming the collection of output laser beams on the substrate.

3. The process according to claim 1, which comprises fitting a number of coupling lenses for forming the collection of input laser beams on the substrate.

4. The process according to claim 1, which comprises fitting a laser diode array having a plurality of individual laser beams and a number of coupling lenses for outputting and forming the collection of input laser beams forming the collection of output laser beams on the substrate.

5. The process according to claim 1, which comprises producing the waveguides from a glass containing more than 50 cation % of $SiO_2$.

6. A process for producing at least one waveguide on a substrate, the at least one waveguide having a length and being detached from the substrate at least over a first part of the length and being connected to the substrate over a second part of the length, the first part of the at least one waveguide being moveable relative to the second part, which comprises:
   providing a substrate;
   applying a partition layer to the substrate;
   applying a first cladding glass layer to the partition layer;
   applying a core layer to the first cladding glass layer and structuring a waveguide core from the core layer;
   applying a second cladding glass layer to the waveguide core and to free subregions formed in the core layer next to the waveguide core for fully enclosing the waveguide core by the first cladding glass layer and the second cladding glass layer for forming a waveguide; and
   detaching the waveguide from the substrate over a first part of a length of the waveguide.

7. A process for producing a waveguide beam converter for geometrical shaping laser beams, which comprises:
   providing a substrate;
   applying a partition layer to the substrate;
   applying a first cladding glass layer to the partition layer;
   applying a core layer to the first cladding glass layer;
   structuring the core layer for forming a number of waveguide cores separated from one another and creating free subregions in the core layer, the waveguide cores remaining on the first cladding glass layer;
   applying a second cladding glass layer to the waveguide cores and to the free subregions between the waveguide cores for fully enclosing the waveguide cores by the first cladding glass layer and the second cladding glass layer;
   removing parts of the first cladding glass layer and the second cladding glass layers lying between the waveguide cores forming a number of waveguides separated from one another;
   removing the partition layer over a first part of a length of the waveguides for detaching the waveguides from the substrate over the first part of the length;
   configuring and disposing each of the waveguides for receiving at least one individual input laser beam; and
   forming and fastening the waveguides for producing a desired output beam pattern of a collection of output laser beams derived from a collection of input laser beams.

* * * * *